US006570611B1

(12) United States Patent
Satou et al.

(10) Patent No.: US 6,570,611 B1
(45) Date of Patent: May 27, 2003

(54) IMAGE DISPLAY

(75) Inventors: Hiroaki Satou, Hyogo (JP); Tetsuro Shiota, Osaka (JP); Hiroshi Miyai, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/646,632

(22) PCT Filed: Jan. 27, 2000

(86) PCT No.: PCT/JP00/00432

§ 371 (c)(1), (2), (4) Date: Sep. 20, 2000

(87) PCT Pub. No.: WO00/45367

PCT Pub. Date: Aug. 3, 2000

(30) Foreign Application Priority Data

Jan. 29, 1999 (JP) .......................................... 11-021907
May 31, 1999 (JP) .......................................... 11-151704

(51) Int. Cl.[7] ......................... H04N 12/02; H04N 5/202
(52) U.S. Cl. ........................ 348/189; 348/674; 348/687
(58) Field of Search ................................ 348/189, 383, 348/673, 674, 687, 677, 607, 618, 675, 790, 797, 800; 345/601, 602, 63, 88, 89

(56) References Cited

U.S. PATENT DOCUMENTS 5,526,051 A * 6/1996 Gove et al. ................. 348/388
6,166,781 A * 12/2000 Kwak et al. ................ 348/674
6,292,157 B1 * 9/2001 Greene et al. ................. 345/1
6,310,650 B1 * 10/2001 Johnson et al. ............. 348/383

FOREIGN PATENT DOCUMENTS

| | | |
|---|---|---|
| JP | 61-24395 | 10/1986 |
| JP | 10-84551 | 3/1998 |
| JP | 10-313418 | 11/1998 |
| JP | 11-109927 | 4/1999 |

OTHER PUBLICATIONS

International Search Report.

* cited by examiner

*Primary Examiner*—Victor R. Kostak
(74) *Attorney, Agent, or Firm*—Merchant & Gould P.C.

(57) ABSTRACT

An image display device has a first look-up table memory (4) for correcting a gamma curve of an input video signal so as to correct a gradation of a display image, a second look-up table memory (5) for generating uniformity correction data on a screen at each gradation level, and a positional information generating portion (10) for generating uniformity correction data corresponding to a position on the screen. A correction data making portion (6) synthesizes the uniformity correction data output from the second look-up table memory (5) and the uniformity correction data output from the positional information generating portion (10). An arithmetic processing circuit (7) corrects the video signal that has been subjected to the gradation correction and read out from the first look-up table memory (4) by using the uniformity correction data output from the correction data making portion (6), and the uniformity correction of the display image is performed at all gradation levels.

6 Claims, 10 Drawing Sheets

IMAGE DISPLAY

TECHNICAL FIELD

The present invention relates to an image display device that can improve uniformity of brightness and chromaticity on a display screen.

BACKGROUND ART

Accompanying the development of ever larger display screens in recent years, not only conventional direct viewing televisions of a CRT system, but various display devices such as a CRT projector, a liquid crystal projector and a plasma display have come into the market. In these image display devices, high screen uniformity of brightness and chromaticity is demanded according to their use. As an example, the liquid crystal projector will be discussed here. Accompanying the development of ever larger display regions, there is a problem of a poor uniformity such as brightness unevenness and color unevenness on a screen, resulting from unevenness of the characteristics of a light source constituting the device, an optical system and a liquid crystal as an image display element. Accordingly, it has become necessary to incorporate a circuit for correcting the poor uniformity due to the combination of above factors into the image display device. For example, JP 61-243495 A describes one technique. The following is a description of a structure of the conventional example mentioned above, with reference to a block diagram of an image display device shown in FIG. 10.

In FIG. 10, a video signal that is input from a video signal input terminal 1 is converted to video signals of primary colors of R, G and B by a signal processing circuit 2. The input video signal is input also to a synchronous separation circuit 8, and a horizontal synchronization signal and a vertical synchronization signal are separated therefrom. The separated horizontal synchronization signal is input to a phase-locking circuit 9, which generates a clock that is phase-locked with the horizontal synchronization signal. The clock and the vertical synchronization signal are input to an address counter 65, and correction data recorded in a memory 64 based on calculated address data are read out. This correction data are converted to an analog value by a D/A conversion circuit 62, and this analog correction value is added to the input video signal by using an adding circuit 61 so as to obtain a video signal, which drives an image display device, for example, a liquid crystal panel.

Recording the correction data in the memory 64 involves the following steps. First, a video signal with a constant level is input to the image display device so as to display the corresponding image on the screen Next, at each block that is formed by dividing the display screen suitably, its brightness level is measured by an image pickup camera, and direct current difference data from an aimed brightness level are recorded in the memory 64 as brightness correction data. The memory 64 in which the correction data are recorded is incorporated into a brightness correction circuit in the image display device. This correction data is read out by calculating an address of the memory corresponding to the display region divided when measuring the brightness, from the horizontal and vertical synchronization signals of the input signal. In this manner, the poor uniformity on the display screen is corrected.

However, this does not necessarily correct the brightness unevenness and the color unevenness in the entire region ranging from a low-brightness (near a black level) video signal input to a high-brightness (near a white level) video signal input, because the brightness measurement that serves as a basis of the correction data is carried out at a constant brightness level.

DISCLOSURE OF INVENTION

In order to solve the problem described above, the basic structure of the image display device of the present invention includes a first look-up table memory for correcting a gamma curve of an input video signal so as to correct a gradation of a display image, a second look-up table memory for generating uniformity correction data on a screen at each gradation level, a positional information generating portion for generating uniformity correction data corresponding to a position on the screen, a uniformity correction data making portion for synthesizing the correction data output from the second look-up table memory and the correction data output from the positional information generating portion, and an arithmetic processing circuit for correcting the video signal that has been subjected to the gradation correction and read out from the first look-up table memory by using the uniformity correction data output from the correction data making portion. The uniformity correction of the display image is performed at all gradation levels.

With the above structure, the uniformity correction according to the image display position at each gradation level of the input video signal is made possible. At the same time, it is possible to display an image without the brightness unevenness and the color unevenness in the entire region ranging from a low-brightness (near a black level) video signal input to a high-brightness (near a white level) video signal input.

In the above basic structure, it is desired that the positional information generating portion includes a first memory for retaining the uniformity correction data in a horizontal direction of the display image, a second memory for retaining the uniformity correction data in a vertical direction, a timing generating circuit for generating addresses to be input to the memories, and an arithmetic portion for calculating a positional information of the uniformity correction data from outputs of the first memory and of the second memory. This enables the reduction of a memory capacity, achieving both high precision and low price.

Also, as another example, the positional information generating portion can have the structure including a first memory for retaining the uniformity correction data in a horizontal direction of the display image, a second memory for retaining the uniformity correction data in a vertical direction, a timing generating circuit for generating addresses to be input to the memories, a low-pass filter for smoothing the output of the first memory and an arithmetic portion for calculating positional information of the uniformity correction data from outputs of the low-pass filter and of the second memory. This enables the reduction of a memory capacity, achieving the structure at still lower cost.

Furthermore, the image display device of the above basic structure may embody the following variation. That is, the image display device further includes a correction position setting portion for setting a uniformity correction position including a correction position setting input means, a CPU for converting horizontal and vertical positional information to binary information based on an input from the correction position setting input means, and horizontal and vertical position setting portions in which the positional information converted to the binary information by the CPU is written and retained. In addition, the positional information generating portion includes a timing generating circuit for generating addresses corresponding to the horizontal and vertical positions of the image, two functional arithmetic portions for calculating the horizontal and vertical address signals as one input and set values of the horizontal and vertical position setting portions as the other input, and an arithmetic portion for calculating a positional information of the uniformity correction data from outputs of the two functional arithmetic portions. This structure achieves a memory reduction, leading to a cost reduction. At the same time, the correction position setting portion for setting the uniformity correction position can achieve a uniformity adjustment with a simple setting of the correction position.

In the above basic structure, a correction amount interpolating arithmetic portion including an interpolating arithmetic portion and an adding arithmetic portion can be provided subsequent to the second look-up table memory, so that the correction amount interpolating arithmetic portion outputs a correction data in which the uniformity correction data is interpolated. With the interpolation, it is possible to reduce memory, as well as to adjust a uniformity correction in a gradation direction in a simple manner.

Furthermore, the image display device of the above basic structure may embody the following variation. That is, the image display device further includes a correction position setting portion for setting a uniformity correction position including a correction position setting input means, a CPU for converting horizontal and vertical positional information to binary information based on an input from the correction position setting input means, and a plurality of horizontal and vertical position setting portions in which the positional information converted to the binary information by the CPU is written and retained. In addition, the positional in format ion generating portion includes a timing generating circuit for generating addresses corresponding to the horizontal and vertical positions of the image, two functional arithmetic portions for calculating the horizontal and vertical address signals as one input and set values of the horizontal and vertical position setting portions as the other input, and an arithmetic portion for calculating a positional information of the uniformity correction data from outputs of the two functional arithmetic portions. A setting switching means of the horizontal and vertical positions switches the horizontal position setting for the uniformity correction at a vertical address timing and the vertical position setting for the uniformity correction at a horizontal address timing.

As described above, the uniformity correction in plural points is made possible by switching the horizontal position setting for the uniformity correction at the vertical address timing and the vertical position setting for the uniformity correction at the horizontal address timing respectively.

BEST MODE FOR CARRYING OUT THE INVENTION

The following is a description of the preferred embodiments of the present invention, with reference to the accompanying drawings.

(First Embodiment)

Figure 1:
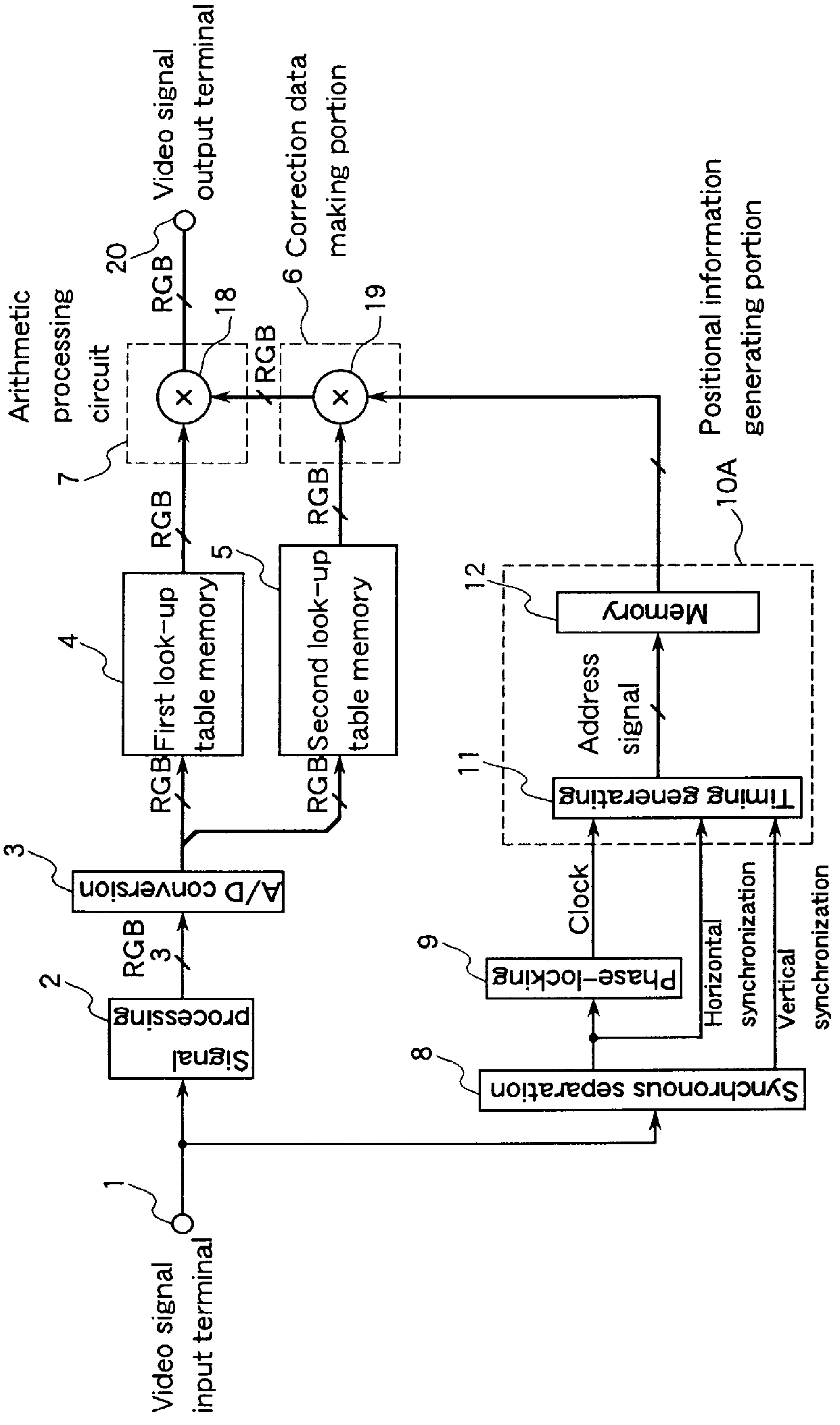
FIG. 1 is a block diagram showing a structure of an image display device according to a first embodiment of the present invention.

FIG. 1 is a block diagram showing a structure of an image display device according to the first embodiment. In FIG. 1, a video signal that is input from a video signal input terminal 1 is converted to video signals of primary colors of R, G and B by a signal processing circuit 2. The input video signal is input also to a synchronous separation circuit 8, and a horizontal synchronization signal and a vertical synchronization signal are separated therefrom. The separated horizontal synchronization signal is input to a phase-locking circuit 9, which generates a horizontal synchronization clock that is phase-locked with the horizontal synchronization signal of the input video signal.

A positional information generating portion 10A includes a timing generating circuit 11 and a memory 12. When the horizontal synchronization signal, the vertical synchronization signal and the horizontal synchronization clock are input, the timing generating circuit 11 generates an address corresponding to a block formed by dividing the display region horizontally and vertically into a grid pattern. In the memory 12, R, G and B correction data that correspond to individual blocks in the display region are stored in advance. Therefore, when the address corresponding to these divided blocks are input from the timing generating circuit 11 to the memory 12, the R, G and B correction data that correspond to the divided blocks are read out. This read out correction data are input to a correction data making portion 6.

On the other hand, the R, G and B video signals output from the signal processing circuit 2 are digitized by an A/D conversion circuit 3, and input to a first look-up table memory 4 for a gradation correction and a second look-up table memory 5 for a uniformity correction. Data stored in the first look-up table memory 4 are for correcting a transmission gamma curve and a gamma curve of a display device with respect to the input video signal, thereby achieving a desired gradation representation. These data are obtained by fetching R, G and B gamma curves and chromaticities with a colorimeter/color-difference meter and arithmetically processing gradation correction data among the above data. In this way, the video signal that is subjected to the gradation correction is supplied to an arithmetic processing circuit 7. Data stored in the second look-up table memory 5 are for inversely correcting uniformity unevenness at each gradation level. These data also are obtained by fetching data of the uniformity unevenness on the display screen at each gradation level of R, G and B with the colorimeter/color-difference meter and calculating these data. This generates a uniformity correction data according to the levels of the input video signal, and these data are input to the correction data making portion 6.

The correction data making portion 6 synthesizes the correction data corresponding to the uniformity unevenness at a position on the display screen that is output from the positional information generating portion 10A and the correction data corresponding to the uniformity unevenness according to the levels of the video signal that is output from the second look-up table memory 5, by using a first multiplier 19. With this synthesized output, a correction amount in each divided block on the display screen is controlled according to the levels of the input signal, thereby considerably reducing the uniformity unevenness due to unevenness of gamma curves in individual pixels. The above example uses the multiplier as the correction data making portion 6, but an adder may be used instead.

The correction data that are processed arithmetically as described above are input to the arithmetic processing circuit 7, and multiplied by the output of the first look-up table memory 4 in a second multiplier 18. This performs the uniformity correction of the video signal that is subjected to the gradation correction in the first look-up table memory 4, and an output signal thereof is output from a video signal output terminal 20. This video signal output here has been subjected to both the gradation correction and the uniformity correction on the display screen corresponding to the gradation level. The above example uses the multiplier as the arithmetic processing circuit 7, but an adder may be used instead.

(Second Embodiment)

Figure 2:
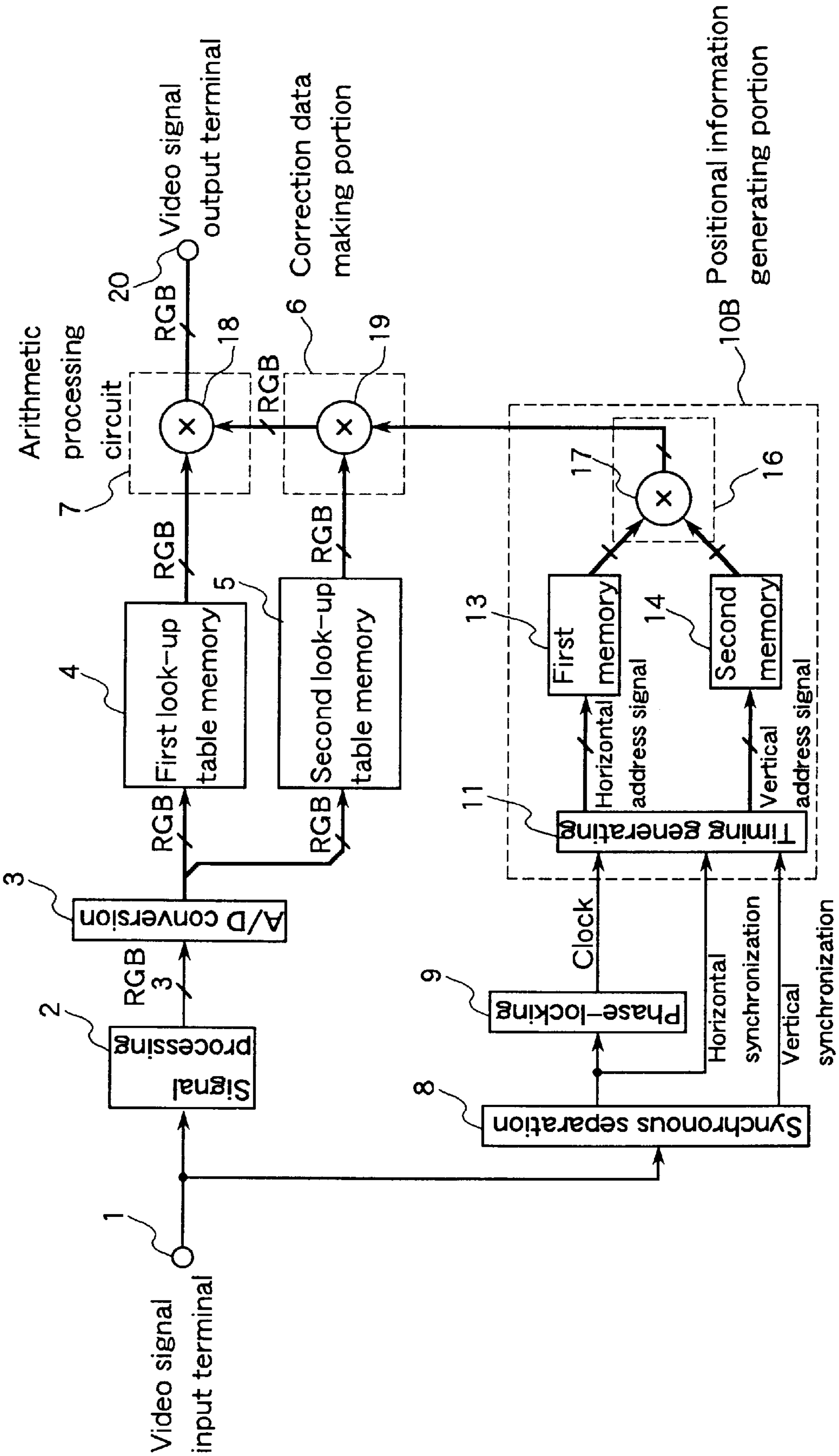
FIG. 2 is a block diagram showing a structure of an image display device according to a second embodiment of the present invention.

FIG. 2 is a block diagram showing a structure of an image display device according to the second embodiment. The same elements as those in the embodiment shown in FIG. 1 will have the same reference numerals and function in the same manner.

The embodiment of FIG. 2 is different from that of FIG. 1 in the structure of a positional information generating portion 10B. The positional information generating portion 10B includes a timing generating circuit 11, a first memory 13 for storing correction data in a horizontal direction, a second memory 14 for storing correction data in a vertical direction and an arithmetic portion 16.

When a vertical synchronization signal, a horizontal synchronization signal and a horizontal synchronization clock that is phase-locked with the horizontal synchronization signal are input, the timing generating circuit 11 generates an address corresponding to a block formed by dividing the display region horizontally and vertically into a grid pattern. Therefore, when the addresses corresponding to these divided blocks are input from the timing generating circuit 11 to the first memory 13 and the second memory 14, the R, G and B correction data that correspond to the divided blocks are read out. Furthermore, the correction data in the horizontal direction read out from the first memory 13 and the correction data in the vertical direction read out from the second memory 14 are input to the arithmetic portion 16. The correction data in the horizontal direction and the correction data in the vertical direction are multiplied in a third multiplier 17 constituting the arithmetic portion 16, and the output is supplied to a correction data making portion 6. The above example uses the multiplier as the arithmetic portion 16, but an adder may be used instead.

The uniformity correction causes a problem in that because a sufficient data amount according to resolution is necessary therefor, a memory amount is increased, thus leading to higher costs. For example, the capacity of the memory 12 in the first embodiment equals the product of the correction data in the horizontal and vertical directions, and thus a large-capacity memory is necessary. On the other hand, as in the present embodiment, by reading out the correction data in the horizontal direction and the correction data in the vertical direction from separate memories and calculating, the sum of the capacities of the first memory 13 and the second memory 14 is only the sum of the correction data amounts in the horizontal and vertical directions. As a result, it is possible to reduce the memory amount, thus lowering the cost while maintaining performance.

R, G and B video signals output from a signal processing circuit 2 are digitized and input to a first look-up table memory 4 for a gradation correction and a second look-up table memory 5 for a uniformity correction. The video signal that is subjected to the gradation correction by using the first look-up table memory is supplied to an arithmetic processing circuit 7. Uniformity correction data corresponding to the levels of the video signal that is output from the second look-up table memory 5 are input to the correction data making portion 6.

The correction data making portion 6 synthesizes the correction data corresponding to the uniformity unevenness at a position on the display screen that is output from the positional information generating portion 10B and the correction data corresponding to the uniformity unevenness according to the levels of the video signal that is output from the second look-up table memory 5, by using a first multiplier 19. This controls a correction amount in each divided block on the display screen according to the level of the input signal, thereby considerably reducing the uniformity unevenness due to unevenness of gamma curves in individual pixels. The above example uses the multiplier as the correction data making portion, but an adder may be used instead.

The correction data that are processed arithmetically as described above are input to the arithmetic processing circuit 7, and multiplied by the output of the first look-up table memory 4 in a second multiplier 18. This performs the uniformity correction of the video signal that is subjected to the gradation correction in the first look-up table memory 4, and an output signal thereof is output from a video signal output terminal 20. This video signal output here has been subjected to both the gradation correction and the uniformity correction on the display screen corresponding to the gradation level. The above example uses the multiplier as the arithmetic processing circuit 7, but an adder may be used instead.

(Third Embodiment)

Figure 3:
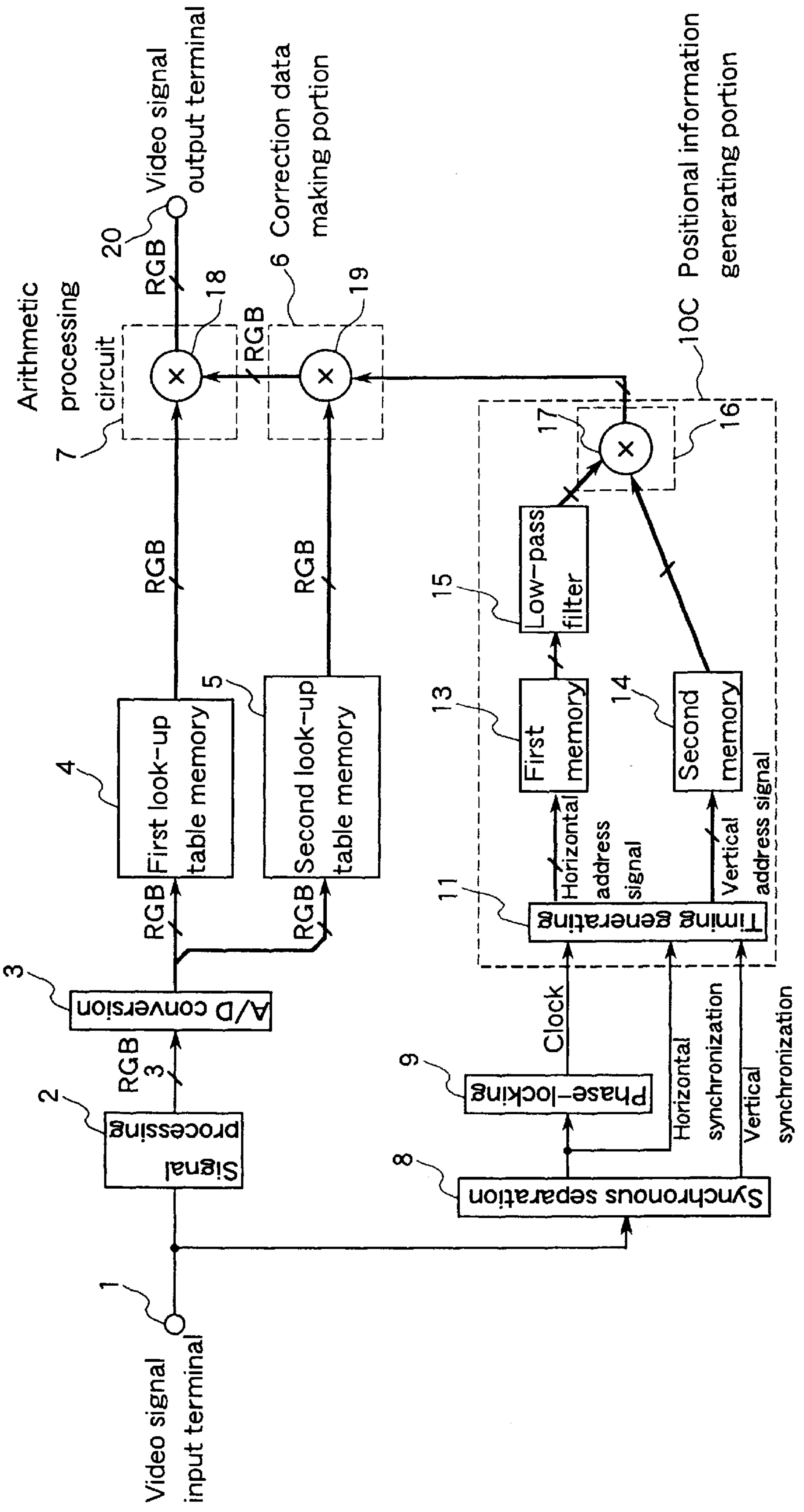
FIG. 3 is a block diagram showing a structure of an image display device according to a third embodiment of the present invention.

FIG. 3 is a block diagram showing a structure of an image display device according to the third embodiment. The same elements as those in the embodiments shown in FIGS. 1 and 2 will have the same reference numerals and function in the same manner.

The embodiment of FIG. 3 is different from that of FIG. 2 in the structure of a positional information generating portion 10C. The positional information generating portion 10C is characterized in that a low-pass filter 15 is inserted between a first memory 13 and a arithmetic portion 16. Correction data in the horizontal direction read out by the first memory 13 are input to the low-pass filter 15 and then to the arithmetic portion 16. This structure achieves the following effects.

The uniformity correction causes a problem in that, because a sufficient data amount according to resolution is necessary therefor, a memory amount is increased, thus leading to higher costs. However, when a simple low-pass filter 15 is inserted at least in the horizontal direction, and the correction data in the vertical direction and the correction data in the horizontal direction are read out from separate memories and calculated, it is possible to reduce the memory amount, thus lowering the cost.

(Fourth Embodiment)

Figure 4:
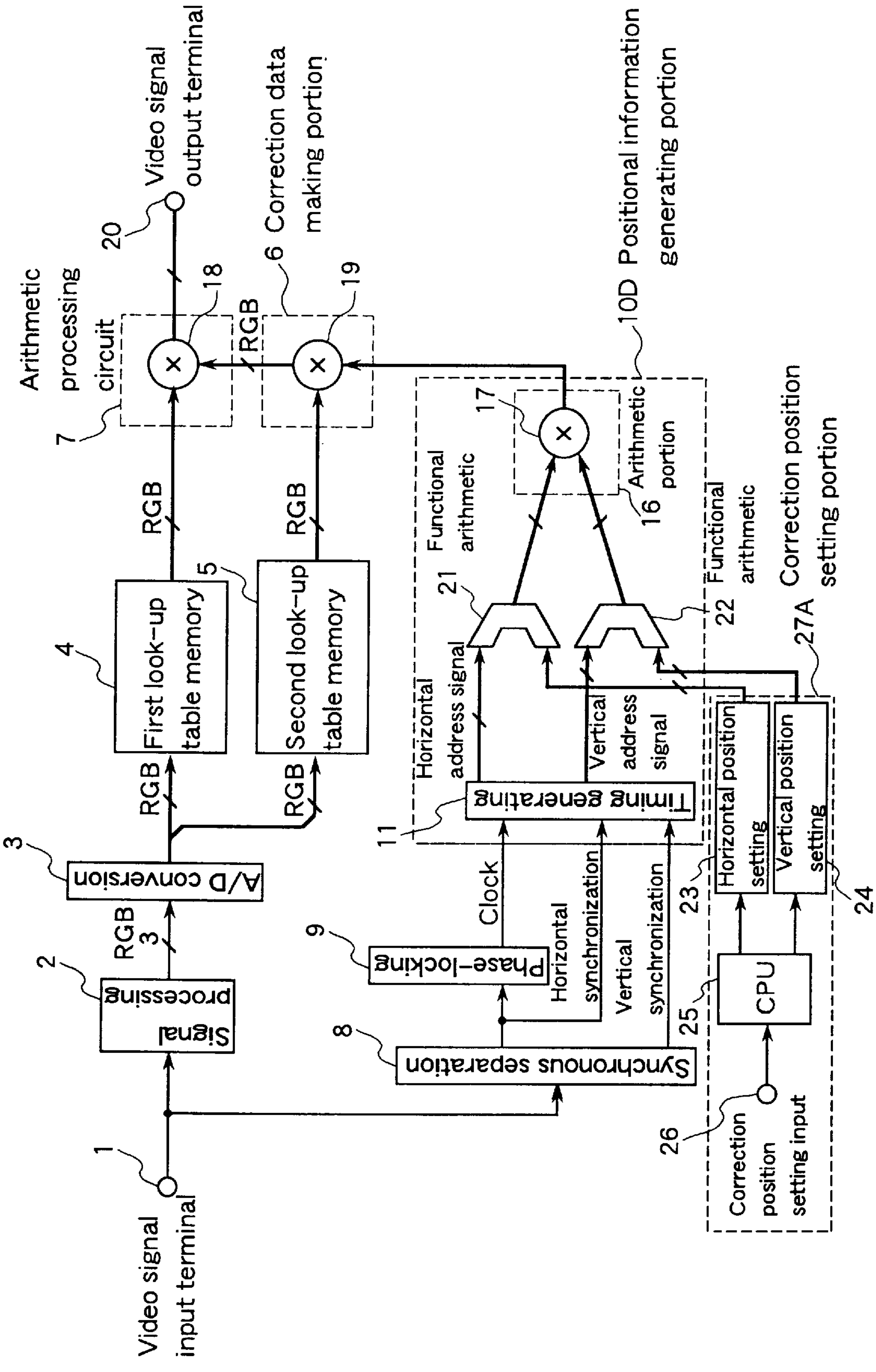
FIG. 4 is a block diagram showing a structure of an image display device according to a fourth embodiment of the present invention.

FIG. 4 is a block diagram showing a structure of an image display device according to the fourth embodiment. The same elements as those in the embodiment shown in FIG. 1 will have the same reference numerals and function in the same manner.

The embodiment of FIG. 4 is different from those of FIGS. 1 to 3 in the structure of a positional information generating portion 10D and in that a correction position setting portion 27A is provided.

Figure 5:
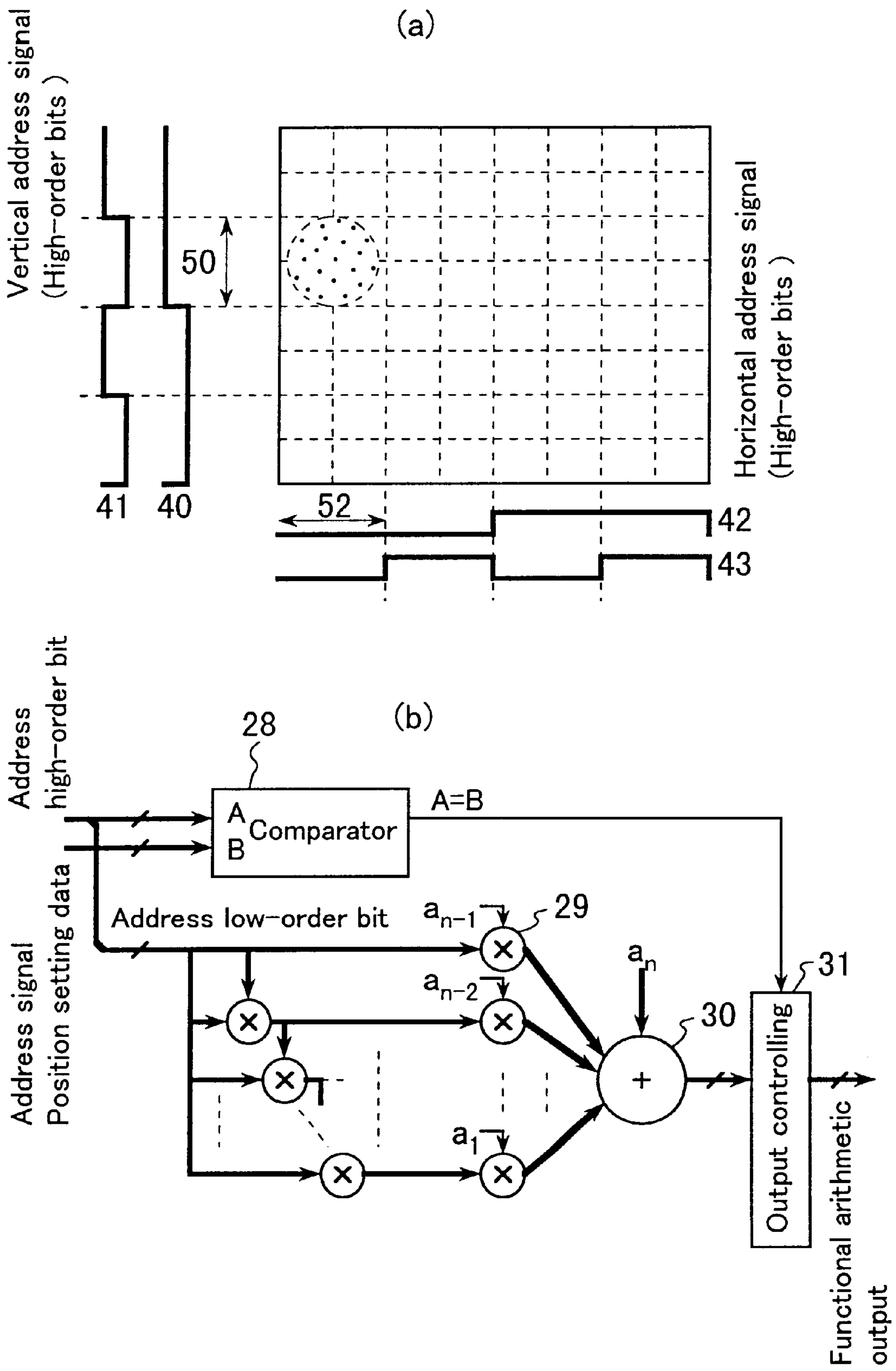
FIG. 5 illustrates an operation of the image display device of FIG. 4.

The correction position setting portion 27A includes a correction position setting input portion 26, a CPU 25, a horizontal position setting portion 23 and a vertical position setting portion 24. The operation thereof will be described with reference to FIG. 5. FIG. 5(*a*) illustrates a display image divided horizontally and vertically into a grid pattern. As shown in the figure, when there is a color unevenness in the top left part of the image, this position is input from the correction position setting input portion 26 such as a touch panel. Based on this positional information, the CPU 25 changes it to binary information so as to write it into the horizontal position setting portion 23 and the vertical position setting portion 24. In the case shown in FIG. 5(*a*), a binary data "00" is written to and retained in the horizontal position setting portion 23, and a binary data "01" is written to and retained in the vertical position setting portion 24.

The positional information generating portion 10D includes a timing generating circuit 11, functional arithmetic circuits 21 and 22 and an arithmetic portion 16. Horizontal and vertical address signals that are generated by the timing generating circuit 11 and binary data that are retained in the horizontal position setting portion 23 and the vertical position setting portion 24 are input to the functional arithmetic circuits 21 and 22, so that uniformity correction data in the horizontal and vertical directions are calculated and output.

As shown in FIG. 5(*b*), the functional arithmetic circuits 21 and 22 include a comparator circuit 28, an adding circuit 30, an output controlling circuit 31 and an arithmetic circuit 29 including a plurality of multiplying circuits. The following is a description of its operation. Low-order bits of an address signal are input to the arithmetic circuit 29, so that the results are added in the adding circuit 30. The output of the adding circuit is expressed by $\Sigma a_i \cdot X$ (i: integer from 1 to n, X: the value of the low-order bit of the address signal), and by selecting a coefficient $a_i$, a desired correction waveform with a positional function can be expressed.

Also, since the calculation is performed with the address low-order bit, the waveform varies periodically in the horizontal and vertical directions. High-order 2 bits and a position setting data 2 bits of the address signal are input to the comparator circuit 28. When the values of the two input lines match, the comparator circuit 28 outputs an A=B signal, and then the output controlling circuit 31 outputs the result calculated by the arithmetic circuit 29. The functional arithmetic circuit 21 outputs the result calculated in the period 52 in FIG. 5(*a*) in the horizontal direction, while the functional arithmetic circuit 22 outputs the result calculated in the period 50 in FIG. 5(*a*) in the vertical direction. Waveforms 40 and 41 in FIG. 5(*a*) show the high-order 2 bits in the vertical address signal, and waveforms 42 and 43 show the high-order 2 bits in the horizontal address signal. The 2 bits are input to the comparator circuit 28 in the above description, but 3 or more bits may be input.

With the above processing, the correction data in the horizontal and vertical directions are output from the functional arithmetic circuits 21 and 22, so as to be input to the arithmetic portion 16. The correction data in the horizontal direction and the correction data in the vertical direction are multiplied in a third multiplier 17 and the output is supplied to a correction data making portion 6. The above structure uses the multiplier 17 as the arithmetic portion 16, but an adder may be used instead. The processing of the uniformity correction by using a positional information output of the arithmetic portion 16 is similar to that of the first embodiment. In the video signal output from a video signal output terminal 20, the gradation correction and the uniformity correction on the display screen corresponding to the gradation levels are achieved.

In the above structure, the correction is performed considering the intersection of the crisscrossed lines shown in FIG. 5(*a*) as a representative point. The shapes of the correction function generated at every intersection are identical regardless of its position. Thus, the functional arithmetic circuits 21 and 22, the horizontal position setting portion 23 and the vertical position setting portion 24 may be small.

(Fifth Embodiment)

Figure 6:
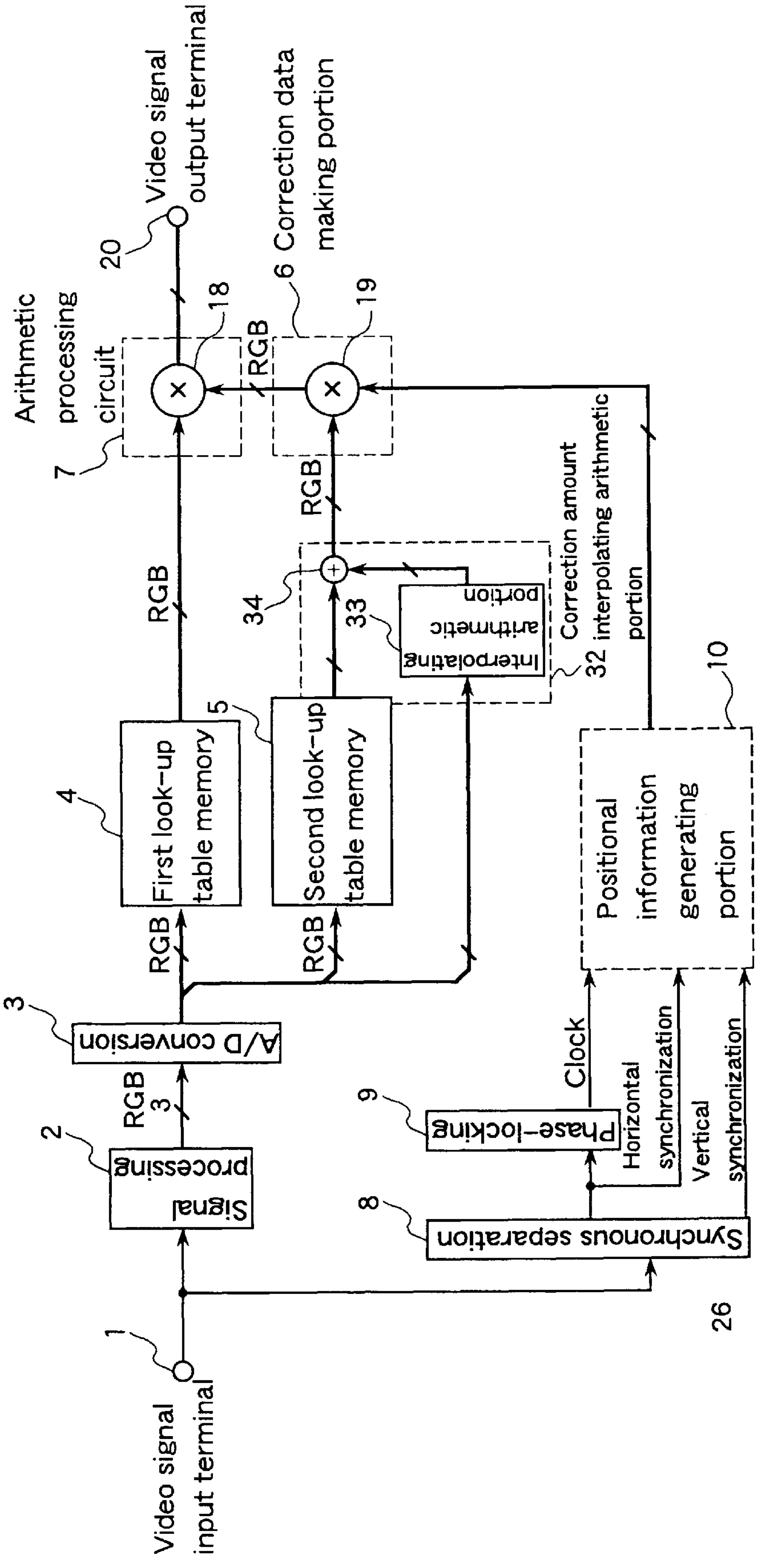
FIG. 6 is a block diagram showing a structure of an image display device according to a fifth embodiment of the present invention.

FIG. 6 is a block diagram showing a structure of an image display device according to the fifth embodiment. The same elements as those in the first embodiment shown in FIG. 1 will have the same reference numerals and function in the same manner.

The embodiment of FIG. 6 is different from those of FIGS. 1 to 4 in that a correction amount interpolating arithmetic portion 32 including an interpolating arithmetic portion 33 and an adding circuit portion 34 is provided subsequent to a second look-up table memory 5. The structure and operation of a positional information generating portion 10 are similar to those in the first embodiment, and the positional information in the horizontal and vertical directions is output as data and input to a correction data making portion 6.

Gradation correction data stored in a first look-up table memory 4 are for achieving a desired gradation representation, and the first look-up table memory 4 outputs the video signal data that has been subjected to the gradation correction to an arithmetic processing circuit 7, as in the first embodiment.

In the present embodiment, the following operation is carried out in order to originate data to be stored in the second look-up table memory 5. (What is called all white signals) in which signal input levels of R, G and B are equal are input from a video signal input terminal 1, digitized by an A/D conversion circuit 3 and input to the first look-up table memory 4 for a gradation correction and the second look-up table memory 5 for a uniformity correction.

High-order bit of the video signal is input to the second look-up table memory 5. Low-order bit of this signal is input to the interpolating arithmetic portion 33. The video signal level previously is adjusted so that the low-order bit of the signal is zero. Therefore, there is no output of the interpolating arithmetic portion 33. When data without a uniformity correction amount are stored in the second look-up table memory 5, there is no uniformity correction data input to the correction data making portion 6, and data stored in the first look-up table memory 4 are output from the arithmetic processing circuit 7. Accordingly, the video signal output terminal 20 outputs an image that is not subjected to the uniformity correction. Next, data stored in the second look-up table memory 5 are changed so as to obtain a correction amount that improves the uniformity. When the above processing is conducted at several signal levels of the video signal input, the relationship between the gradation level and the correction amount shown in FIG. 7(*a*) is obtained. This data is stored in the second look-up table memory 5.

Figure 7:
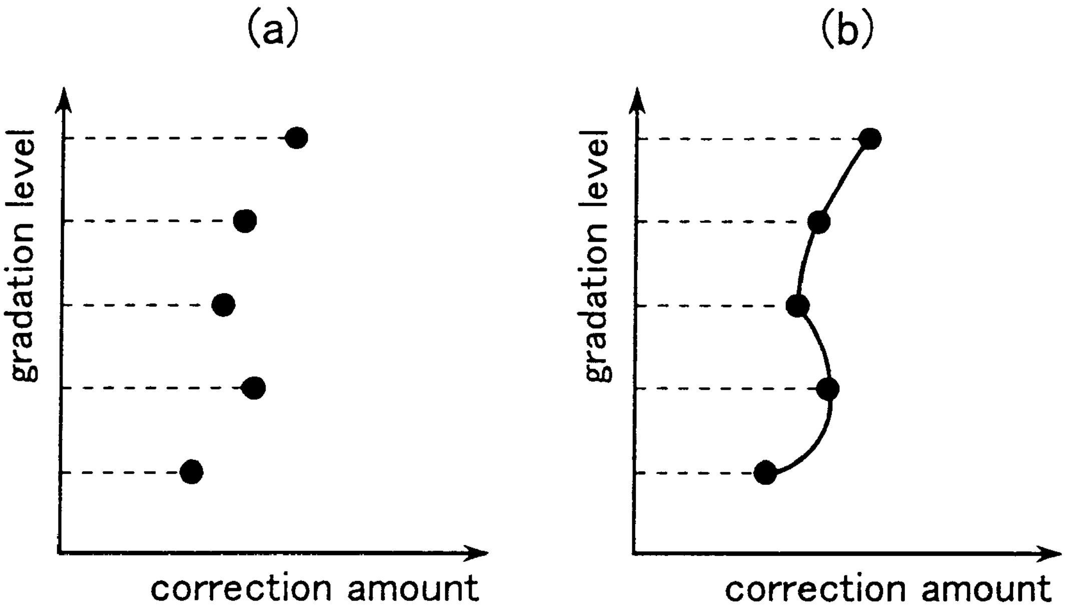
FIG. 7 illustrates an operation of the image display device of FIG. 6.

Next, the low-order bit of the signal is input to the interpolating arithmetic portion 33, so as to interpolate the correction amounts of two gradation levels obtained as in FIG. 7(*a*). Either a method of linear interpolation by means of a linear function approximation or a method of calculating from the correction amount of three or more gradation levels by constituting a non-recursive filter is used for this interpolation. The output of the interpolating arithmetic portion 33 and the data stored in the second look-up table memory 5 are added in the adding circuit 34, so that the correction data that is interpolated as shown in FIG. 7(*b*) is output and then input to the correction data making portion 6.

The subsequent operation is similar to that of the first embodiment, and achieves both the gradation correction and the uniformity on the display screen corresponding to the gradation level.

(Sixth Embodiment)

Figure 8:
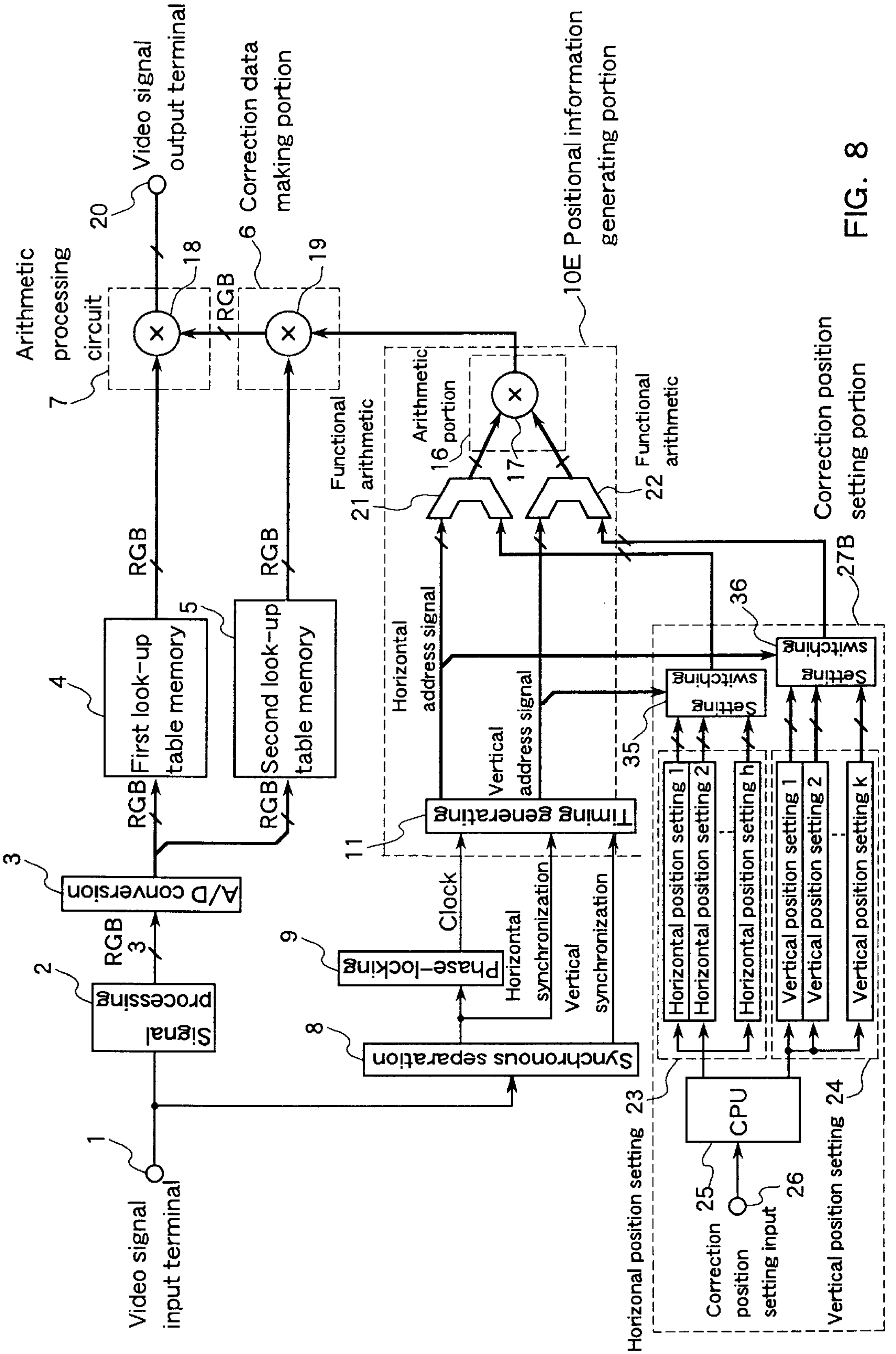
FIG. 8 is a block diagram showing a structure of an image display device according to a sixth embodiment of the present invention.

FIG. 8 is a block diagram showing a structure of an image display device according to the sixth embodiment. The same elements as those in the embodiments shown in FIGS. 1 and 4 will have the same reference numerals and function in the same manner.

The embodiment of FIG. 8 uses a correction position setting portion 27B instead of the correction position setting portion 27A in the embodiment of FIG. 4. The correction position setting portion 27B includes a correction position setting input portion 26, a CPU 25, a horizontal position setting portion 23, a vertical position setting portion 24 and setting switching circuits 35 and 36. It is possible to set a plurality of horizontal positions (h) in the horizontal position setting portion 23 and to set a plurality of vertical positions (k) in the vertical position setting portion 24.

Figure 9:
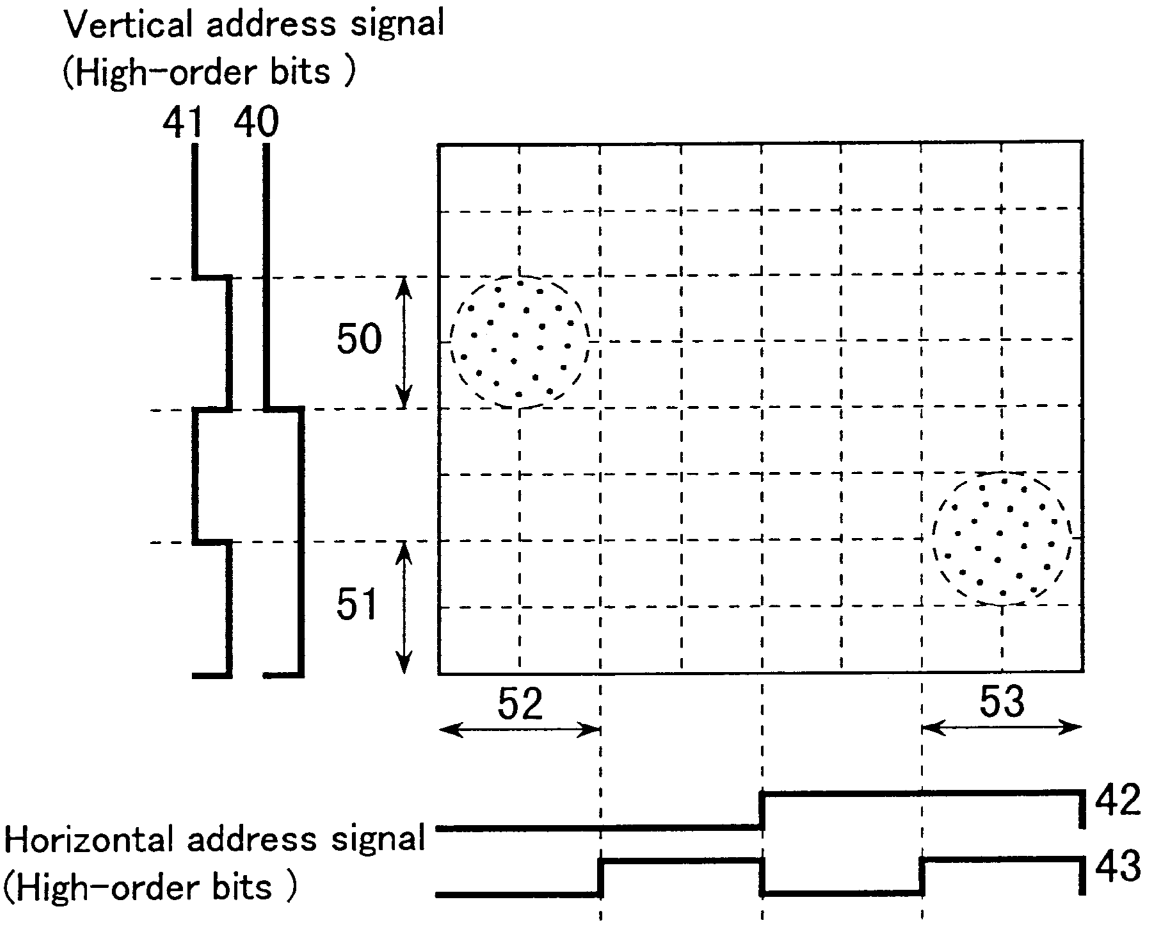
FIG. 9 illustrates an operation of the image display device of FIG. 8.
Figure 10:
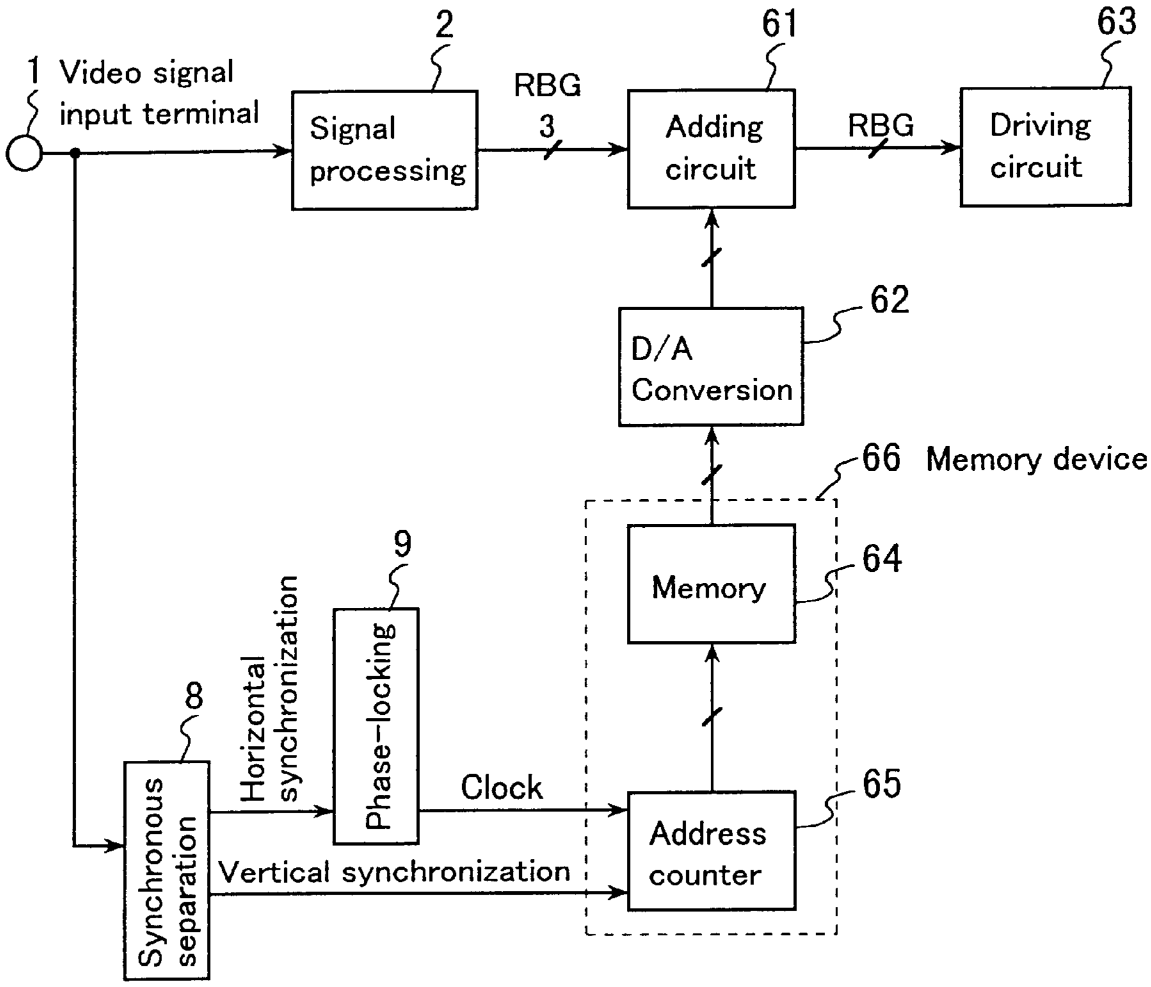
FIG . 10 PRIOR ART
FIG. 10 is a block diagram showing a structure of a conventional image display device.

Next, the following is a description of operations when there are color unevennesses in plural parts of the image and a correction is necessary, as shown in FIG. 9. The correction position setting input portion 26 is, for example, a touch panel corresponding to the position of the image. The correction position setting input portion 26 inputs information regarding the position to be corrected to the CPU 25. The CPU 25 inputs a plurality of positional data corresponding to horizontal and vertical positional addresses of the image to the horizontal position setting portion 23 and the vertical position setting portion 24, and they are retained. High-order bits of the vertical address are input to the setting switching circuit 35, and the horizontal position settings 1 to h are selected sequentially and output according to a timing of an address signal.

In the case of FIG. 9, for example, the CPU 25 inputs the setting to the horizontal position setting portion 23, so that it is possible to output the horizontal position setting of the range of a horizontal period 52 at a timing of a vertical period 50 and to output the horizontal position setting of the range of a horizontal period 53 at a timing of a vertical period 51. Similarly, the CPU 25 inputs the setting to the vertical position setting portion 24, such that it is possible to output a vertical position setting of the range of a vertical period 50 at a timing of a horizontal period 52 and to output a vertical position setting of the range of a vertical period 51 at a timing of a horizontal period 53.

With the above processing, correction positional information is sent from the setting switching circuits 35 and 36 to the functional arithmetic portions 21 and 22 respectively. The operation subsequent to the functional arithmetic portions is similar to that of the fourth embodiment, and achieves the uniformity correction of a plurality of regions with color unevenness shown in FIG. 9.

INDUSTRIAL APPLICABILITY

The present invention achieves the following effects.

1) It is possible to correct the brightness unevenness and the color unevenness in the entire region ranging from a low-brightness (near a black level) video signal input to a high-brightness (near a white level) video signal input, and to display an image without the uniformity unevenness with respect to all gradation levels of the input video signal.

2) With a circuit structure that reduces a memory capacity, it is possible to reduce costs.

3) With a simple method, it is possible to set a correction amount in each correction position and gradation level.

4) It is possible to achieve uniformity correction in plural parts of the image.

What is claimed is:

1. An image display device comprising:

a first look-up table memory for correcting a gamma curve of an input video signal so as to correct a gradation of a display image;

a second look-up table memory for generating uniformity correction data on a screen at each gradation level;

a positional information generating portion for generating uniformity correction data corresponding to a position on the screen;

a correction data making portion for synthesizing the uniformity correction data output from the second look-up table memory and the uniformity correction data output from the positional information generating portion; and an arithmetic processing circuit for correcting the video signal that has been subjected to the gradation correction and read out from the first look-up table memory by using the uniformity correction data output from the correction data making portion;

wherein the uniformity correction of the display image is performed at all gradation levels.

2. The image display device according to claim 1, wherein the positional information generating portion includes a first memory for retaining the uniformity correction data in a horizontal direction of the display image, a second memory for retaining the uniformity correction data in a vertical direction, a timing generating circuit for generating addresses to be input to the memories, and an arithmetic portion for calculating positional information of the uniformity correction data from outputs of the first memory and of the second memory.

3. The image display device according to claim 1, wherein the positional information generating portion includes a first memory for retaining uniformity correction data in a horizontal direction of the display image, a second memory for retaining uniformity correction data in a vertical direction, a timing generating circuit for generating addresses to be input to the memories, a low-pass filter for smoothing the output of the first memory and an arithmetic portion for calculating a positional information of the uniformity correction data from outputs of the low-pass filter and of the second memory.

4. The image display device according to claim 1 further comprising:

a correction position setting portion for setting a uniformity correction position including;

a correction position setting input means, a CPU for converting horizontal and vertical positional information to binary information based on an input from the correction position setting input means, and horizontal and vertical position setting portions in which the positional information converted to the binary information by the CPU is written and retained, wherein the positional information generating portion includes a timing generating circuit for generating addresses corresponding to the horizontal and vertical positions of the image, two functional arithmetic portions for calculating the horizontal and vertical address signals as one input and set values of the horizontal and vertical position setting portions as the other input, and an arithmetic portion for calculating a positional information of the uniformity correction data from outputs of the two functional arithmetic portions.

5. The image display device according to claim 1, wherein a correction amount interpolating arithmetic portion including an interpolating arithmetic portion and an adding arithmetic portion is provided subsequent to the second look-up table memory, so that the correction amount interpolating arithmetic portion outputs correction data in which the uniformity correction data are interpolated.

6. The image display device according to claim 1 further comprising:

a correction position setting portion for setting a uniformity correction position including;

a correction position setting input means, a CPU for converting horizontal and vertical positional information to binary information based on an input from the correction position setting input means, and a plurality of horizontal and vertical position setting portions in which the positional information converted to the binary information by the CPU is written and retained, wherein the positional information generating portion includes a timing generating circuit for generating addresses corresponding to the horizontal and vertical positions of the image, two functional arithmetic portions for calculating the horizontal and vertical address signals as one input and set values of the horizontal and vertical position setting portions as the other input, and an arithmetic portion for calculating a positional information of the uniformity correction data from outputs of the two functional arithmetic portions, and a setting switching means of the horizontal and vertical positions switches the horizontal position setting for the uniformity correction at a vertical address timing and the vertical position setting for the uniformity correction at a horizontal address timing.

* * * * *